(12) United States Patent
Kim et al.

(10) Patent No.: US 11,149,204 B2
(45) Date of Patent: Oct. 19, 2021

(54) LIQUID CRYSTAL ALIGNMENT AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY USING SAME

(71) Applicant: LG CHEM, LTD., Seoul (KR)

(72) Inventors: Seongku Kim, Daejeon (KR); Jung Ho Jo, Daejeon (KR); Hoonseo Park, Daejeon (KR); Hee Han, Daejeon (KR); Jun Young Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/628,906

(22) PCT Filed: Apr. 17, 2019

(86) PCT No.: PCT/KR2019/004650
§ 371 (c)(1),
(2) Date: Jan. 6, 2020

(87) PCT Pub. No.: WO2019/221402
PCT Pub. Date: Nov. 21, 2019

(65) Prior Publication Data
US 2020/0190405 A1     Jun. 18, 2020

(30) Foreign Application Priority Data

May 17, 2018   (KR) .................. 10-2018-0056586

(51) Int. Cl.
*C09K 19/56*    (2006.01)
*C08G 73/10*    (2006.01)

(52) U.S. Cl.
CPC .......... *C09K 19/56* (2013.01); *C08G 73/1017* (2013.01); *C08G 73/1032* (2013.01); *C08G 73/1067* (2013.01)

(58) Field of Classification Search
CPC .............. C09K 19/56; C08G 73/1017; C08G 73/1032; C08G 73/1067
See application file for complete search history.

(56) References Cited

U.S. PATENT DOCUMENTS

| | | | |
|---|---|---|---|
| 5,580,950 A | 12/1996 | Harris et al. | |
| 9,909,065 B2 | 3/2018 | Ooki et al. | |
| 2012/0172542 A1 | 7/2012 | Tsai | |
| 2017/0058200 A1 | 3/2017 | Eckert et al. | |

FOREIGN PATENT DOCUMENTS

| | | | |
|---|---|---|---|
| CN | 101042504 | 9/2007 | |
| CN | 101135813 | 3/2008 | |
| CN | 101495915 | 7/2009 | |
| CN | 101570635 | 11/2009 | |
| CN | 102649909 | 8/2012 | |
| CN | 103849406 | 6/2014 | |
| CN | 104861990 | 8/2015 | |
| CN | 104927880 | 9/2015 | |
| CN | 105038817 | 11/2015 | |
| CN | 105385454 | 3/2016 | |
| CN | 106905985 | 6/2017 | |
| EP | 3 159 737 A1 | 4/2017 | |
| JP | 2001296525 | 10/2001 | |
| JP | 2002020487 | 1/2002 | |
| JP | 2007047222 | 2/2007 | |
| JP | 2007086287 | 4/2007 | |
| JP | 2009031319 | 2/2009 | |
| JP | WO2008013285 A1 * | 12/2009 | ............. C08G 73/10 |
| JP | 2011039145 | 2/2011 | |
| JP | 2011048048 | 3/2011 | |
| JP | 2011184508 | 9/2011 | |
| JP | 2012001701 | 1/2012 | |
| JP | 2012001701 A * | 1/2012 | ............. C08G 73/10 |
| JP | 5690508 | 3/2015 | |
| JP | 5690508 B2 * | 3/2015 | |
| JP | 2015215591 A * | 12/2015 | ............. C08G 73/10 |
| JP | 2017102350 | 6/2017 | |
| KR | 10-20010100887 | 11/2001 | |
| KR | 10-20080073235 | 8/2008 | |
| KR | 10-20090052317 | 5/2009 | |
| KR | 20090052317 A * | 5/2009 | ............. C08G 73/10 |
| KR | 10-20120084253 | 7/2012 | |
| KR | 10-20130049699 | 5/2013 | |
| KR | 10-20140029167 | 3/2014 | |
| KR | 10-20140074117 | 6/2014 | |
| KR | 10-20150122584 | 11/2015 | |
| KR | 20150122584 A * | 11/2015 | |
| KR | 10-20160122636 | 10/2016 | |
| KR | 10-20160124167 | 10/2016 | |
| KR | 10-20190089454 | 7/2019 | |
| TW | 200831611 | 8/2008 | |
| TW | 201540777 | 11/2015 | |
| WO | 2013161569 | 10/2013 | |
| WO | 2019143053 | 7/2019 | |

OTHER PUBLICATIONS

Office Action of Chinese Patent Office in Appl'n No. 201980003044.0 dated Sep. 2, 2021.

* cited by examiner

*Primary Examiner* — Bijan Ahvazi
(74) *Attorney, Agent, or Firm* — Dentons US LLP

(57) ABSTRACT

Provided is a liquid crystal alignment agent composition comprising a terminal modifier compound containing an amino group together with a polyimide containing an acid anhydride group at its terminus or a precursor polymer thereof, a method for preparing a liquid crystal alignment film using the same, and a liquid crystal alignment film and a liquid crystal display using the same.

14 Claims, No Drawings

LIQUID CRYSTAL ALIGNMENT AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY USING SAME

CROSS-REFERENCE TO RELATED APPLICATION(S) APPLICATIONS

This application is a National Stage Application of international Application No. PCT/KR2019/004650 filed on Apr. 17, 2019 which claims priority to and the benefit of the filing date of Korean Patent Application No. 10-2018-0056586 filed with Korean Intellectual Property Office on May 17, 2018, the entire contents of which are incorporated herein by reference.

TECHNICAL FIELD

The present invention relates to a liquid crystal alignment agent composition capable of having a low discoloration property even during long-term storage and thus exhibiting excellent light transmittance when applied as a liquid crystal alignment film, and also capable of realizing improved alignment properties and electrical characteristics, a method for preparing a liquid crystal alignment film using the same, and a liquid crystal alignment film and a liquid crystal display using the same.

BACKGROUND ART

In a liquid crystal display, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In order to obtain uniform luminance (brightness) and a high contrast ratio in a liquid crystal display, it is essential to uniformly align liquid crystals.

As one of the conventional methods of aligning liquid crystals, a rubbing method of coating a polymer film such as a polyimide onto a substrate such as glass or the like and rubbing a surface thereof using fibers such as nylon or polyester in a predetermined direction has been used. However, the rubbing method can cause serious problems during a manufacturing process of the liquid crystal panel because fine dust or electrostatic discharge (ESD) occurs when the fiber and polymer film are rubbed.

In order to solve the problems of the rubbing method, a photo-alignment method for inducing anisotropy in a polymer film by light irradiation rather than the rubbing, and aligning liquid crystals using anisotropy, has been studied recently.

As materials that can be used for the photo-alignment method, various materials have been introduced, among which a polyimide is mainly used for various superior performance of a liquid crystal alignment film. However, the polyimide is usually poor in solubility in a solvent, and so it is difficult to apply directly to a manufacturing process of coating it in a solution state to form an alignment film. Accordingly, after coating in the form of a precursor such as a polyamic acid or a polyamic acid ester having excellent solubility, a heat treatment process is performed at a temperature of 200° C. to 230° C. to form the polyimide, which is then subjected to light irradiation to perform alignment treatment.

However, recently, as the required performance of a liquid crystal display has been increased and a low-power display has been required, high electrical reliability, high light transmittance, and high storage stability in a high temperature environment have been considered important.

Thus, there is a need to develop a liquid crystal alignment agent composition that is capable of having a low discoloration property even during long-term storage and thus exhibiting excellent light transmittance when applied as a liquid crystal alignment film, and also of realizing improved alignment properties and electrical characteristics.

DETAILED DESCRIPTION OF THE INVENTION

Technical Problem

It is an object of the present invention to provide a liquid crystal alignment agent composition that is capable of having a low discoloration property even during long-term storage and thus exhibiting excellent light transmittance when applied as a liquid crystal alignment film, and also of achieving improved alignment properties and electrical characteristics.

It is another object of the present invention to provide a method for preparing a liquid crystal alignment film using the aforementioned liquid crystal alignment agent composition.

It is a further object of the present invention to provide a liquid crystal alignment film prepared by the aforementioned preparation method, and a liquid crystal display including the same.

Technical Solution

In order to achieve the above objects, one aspect of the invention provides a liquid crystal alignment agent composition including: a polymer containing at least one repeating unit selected from the group consisting of a repeating unit of the following Chemical Formula 1, a repeating unit of the following Chemical Formula 2, and a repeating unit of the following Chemical Formula 3, in which an acid anhydride group is bonded to at least one terminus thereof; and a terminal modifier compound containing an amino group:

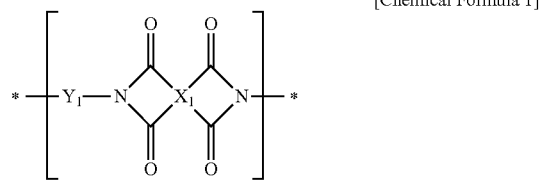

[Chemical Formula 1]

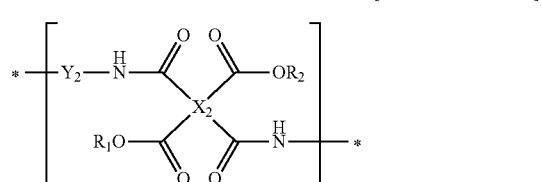

[Chemical Formula 2]

[Chemical Formula 3]

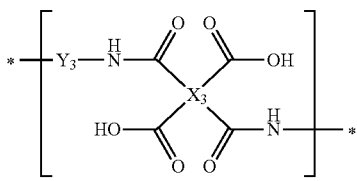

wherein in Chemical Formulas 1 to 3:
one of $R_1$ and $R_2$ is an alkyl group having 1 to 10 carbon atom and the other is hydrogen or an alkyl group having 1 to 10 carbon atoms;
$X_1$ to $X_3$ are each independently a tetravalent organic group; and
$Y_1$ to $Y_3$ are each independently a divalent organic group of the following Chemical Formula 4:

[Chemical Formula 4]

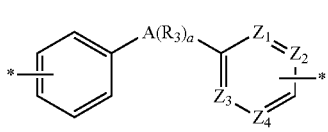

wherein in Chemical Formula 4, A is a Group 15 element, $R_3$ is one of hydrogen and an alkyl group having 1 to 10 carbon atoms, a is an integer from 1 to 3, at least one of $Z_1$ to $Z_4$ is nitrogen and the rest are carbon.

Another aspect of the invention provides a method for preparing a liquid crystal alignment film including the steps of: coating the liquid crystal alignment agent composition onto a substrate to form a coating film; drying the coating film; irradiating the dried coating film with light or rubbing the coating film to perform alignment treatment; and heat-treating and curing the alignment-treated coating film.

Other aspects of the invention provide a liquid crystal alignment film which is produced according to the process for preparing the liquid crystal alignment film, and a liquid crystal display including the same.

Hereinafter, a liquid crystal alignment agent composition, a method for preparing a liquid crystal alignment film using the same, and a liquid crystal alignment film using the same according to specific embodiments of the present invention will be described in more detail.

I. Liquid Crystal Alignment Agent Composition

According to one embodiment of the invention, a liquid crystal alignment agent composition can be provided, including: a polymer containing at least one repeating unit selected from the group consisting of a repeating unit of Chemical Formula 1, a repeating unit of Chemical Formula 2, and a repeating unit of Chemical Formula 3, in which an acid anhydride group is bonded to at least one terminus thereof; and a terminal modifier compound containing an amino group.

The present inventors found through experiments that as the terminal modifier compound containing an amino group is added to a polymer containing, as a main chain, at least one repeating unit selected from the group consisting of a polyamic acid repeating unit, a polyamic acid ester repeating unit, and a polyimide repeating unit in which an acid anhydride group is bonded to at least one terminus of the main chain, as in the liquid crystal alignment agent composition of the one embodiment described above, the acid anhydride group present at the main chain terminus of the polymer and the amino group of the terminal modifier compound react with each other to thereby modify the acid anhydride group, which is a reactive functional group at the main chain terminus, into an imide group, an amic acid group, or an amic acid ester group, thereby making it possible to have higher light transmittance in the liquid crystal alignment film obtained from the liquid crystal alignment agent composition than before the addition of the terminal modifier compound, and to realize more improved electrical reliability and alignment properties in a liquid crystal cell provided with a liquid crystal alignment film. The present invention has been completed on the basis of these findings.

Specifically, as the acid anhydride group at the main chain terminus of the polymer is modified into an imide group, an amic acid group, an amic acid ester group, or the like due to the terminal modifier compound contained in the liquid crystal alignment agent composition, it is possible to prevent oxidation of the acid anhydride group and thus have high light transmittance in the liquid crystal alignment film, and also to realize more improved electrical reliability and alignment properties in a liquid crystal cell provided with a liquid crystal alignment film.

In particular, in an embodiment of the present invention, it has been found that as a polymer for a liquid crystal alignment agent containing a repeating unit of Chemical Formula 4 prepared from the reactant including a diamine compound of a specific structure containing a nitrogen atom is used, it is possible to realize excellent electrical characteristics, such as having a high initial voltage holding ratio at a high temperature, showing less change in the voltage holding ratio even during long-term storage, and the like, and also to improve a reduction in contrast ratio and an afterimage phenomenon, thereby accomplishing the present invention. Hereinafter, embodiments of the present invention will be described in more detail.

Unless specified otherwise herein, the following terms can be defined as follows.

Throughout the specification, when one part "includes" one constituent element, unless otherwise specifically described, this does not mean that another constituent element is excluded, but means that another constituent element can be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents can be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" can be a biphenyl group. That is, the biphenyl group can also be an aryl group, and can be interpreted as a substituent to which two phenyl groups are linked.

As used herein, the notation

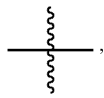

or ⸺* means a bond linked to another substituent group, and the direct bond means the case where no other atoms exist in the parts represented as L.

In the present specification, an alkyl group is a monovalent functional group derived from an alkane, and can be a straight chain or a branched chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl, and the like, but are not limited thereto.

In the present specification, a cycloalkyl group is a monovalent functional group derived from a cycloalkane, which can be monocyclic or polycyclic. The number of carbon atoms thereof is not particularly limited, but is 3 to 20. According to one embodiment, the number of carbon atoms of the cycloalkyl group is 3 to 10. Specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, bicyclo[2,2,1]heptyl, and the like, but are not limited thereto. The cycloalkyl group can be substituted or unsubstituted.

In the present specification, an aryl group is a monovalent functional group derived from an arene, and is not particularly limited, but the number of carbon atoms thereof is preferably 6 to 20. The aryl group can be a monocyclic aryl group or a polycyclic aryl group. Specifically, in the aryl group, the monocyclic aryl group can include a phenyl group, a biphenyl group, a terphenyl group, or the like, but is not limited thereto. The polycyclic aryl group can include a naphthyl group, an anthracenyl group, a phenanthryl group, a pyrenyl group, a perylenyl group, a chrycenyl group, a fluorenyl group, or the like, but is not limited thereto. The aryl group can be substituted or unsubstituted.

In the present specification, a heteroaryl group includes one or more atoms other than carbon, that is, one or more heteroatoms, and specifically, the heteroatom can include one or more atoms selected from the group consisting of O, N, Se, and S, and the like. The number of carbon atoms thereof is not particularly limited, but is preferably 4 to 20, and the heteroaryl group can be monocyclic or polycyclic. Examples of a heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridyl group, an azaindolyl group, an isoindolyl group, an indazolyl group, a purine group (purine), a pteridyl group (pteridine), a beta-carboline group, a naphthyridyl group (naphthyridine), a ter-pyridyl group, a phenazinyl group, an imidazopyridyl group, a pyropyridyl group, an azepine group, a pyrazolyl group, a dibenzofuranyl group, and the like, but are not limited thereto. The heteroaryl group can be substituted or unsubstituted.

In the present specification, a haloalkyl group means a functional group in which the alkyl group described above is substituted with a halogen, and examples of the halogen group include fluorine, chlorine, bromine, and iodine. The haloalkyl group can be substituted or unsubstituted.

In the present specification, an alkylene group is a divalent functional group derived from an alkane, and the description of the alkyl group as defined above can be applied except that the alkylene is a divalent functional group. For example, the alkylene group is a straight chain or a branched chain, and can include a methylene group, an ethylene group, a propylene group, an isobutylene group, a sec-butylene group, a tert-butylene group, a pentylene group, a hexylene group, or the like. The alkylene group can be substituted or unsubstituted.

In the present specification, a haloalkylene group is a functional group in which one or more hydrogen atoms contained in a divalent functional group derived from an alkane are substituted with halogen atoms, and examples of the halogen group include fluorine, chlorine, bromine, and iodine.

In the present specification, a cycloalkylene group is a divalent functional group derived from a cycloalkane, and the description of the cycloalkyl group as defined above can be applied except that the cycloalkylene is a divalent functional group. The cycloalkylene group can be substituted or unsubstituted.

In the present specification, a heterocycloalkylene group has 3 to 20 carbon atoms, 3 to 10 carbon atoms, or 6 to 20 carbon atoms. The heterocycloalkylene group is a cycloalkylene group containing O, N, or S as the heteroatom, and the description of the cycloalkylene as defined above can be applied, except that the heterocycloalkylene is a divalent functional group. The heterocycloalkylene group can be substituted or unsubstituted.

In the present specification, an arylene group is a divalent functional group derived from an arene, and the description of the aryl group as defined above can be applied, except that the arylene is a divalent functional group. For example, the arylene group can be a straight chain or a branched chain, and examples thereof can be a phenylene group, a biphenylene group, a terphenylene group, and the like. The arylene group can be substituted or unsubstituted.

In the present specification, a heteroarylene group has 2 to 20 carbon atoms, 2 to 10 carbon atoms, or 6 to 20 carbon atoms. The heteroarylene group is an arylene group containing O, N, or S as a heteroatom, and the description of the heteroaryl group as defined above can be applied, except that the heteroarylene is a divalent functional group. The heteroarylene group can be substituted or unsubstituted.

In the present specification, a fluoroalkyl group having 1 to 10 carbon atoms can be one in which at least one hydrogen of the alkyl group having 1 to 10 carbon atoms is substituted with fluorine. The fluoroalkoxy group having 1 to 10 carbon atoms can be one in which at least one hydrogen of the alkoxy group having 1 to 10 carbon atoms is substituted with fluorine.

In the present specification, a halogen can be fluorine (F), chlorine (Cl), bromine (Br), or iodine (I).

In the present specification, a Group 15 element can be nitrogen (N), phosphorus (P), arsenic (As), antimony (Sb), or bismuth (Bi).

In the present specification, a nitrogen oxide is a compound in which a nitrogen atom and an oxygen atom are bonded, and the nitrogen oxide functional group means a functional group containing nitrogen oxide in the functional group. Examples of the nitrogen oxide functional group include a nitro group (—$NO_2$) and the like.

In the present specification, a multivalent organic group is a residue in which a plurality of hydrogen atoms bonding to an arbitrary compound are removed, and for example, it can be a divalent organic group, a trivalent organic group, or a tetravalent organic group. As an example, a tetravalent organic group derived from a cyclobutane means a residue in which any four hydrogen atoms bonded to cyclobutane are removed.

In the present specification, a direct bond or a single bond means being connected to a bond line where no atoms or atomic groups exist at the corresponding position. Specifically, it means the case where no other atoms exist in the parts represented as $L_1$ and $L_2$ in the chemical formula.

(1) Polymer

The polymer can contain at least one repeating unit selected from the group consisting of a repeating unit of Chemical Formula 1, a repeating unit of Chemical Formula 2, and a repeating unit of Chemical Formula 3.

That is, the polymer can include one type of repeating unit of Chemical Formula 1, one type of repeating unit of Chemical Formula 2, one type of repeating unit of Chemical Formula 3, or a copolymer in which two or more types of these repeating units are mixed.

The repeating unit of Chemical Formula 1 can correspond to a polyimide repeating unit, the repeating unit of Chemical Formula 2 can correspond to a polyamic acid ester repeating unit, and the repeating unit of Chemical Formula 3 can correspond to a polyamic acid repeating unit. Therefore, the polymer can include one type of polyamic acid repeating unit, one type of polyamic acid ester repeating unit, one type of polyimide repeating unit, or a copolymer in which two or more types of these repeating units are mixed or bonded.

The at least one repeating unit selected from the group consisting of a repeating unit of Chemical Formula 1, a repeating unit of Chemical Formula 2, and a repeating unit of Chemical Formula 3 can form a main chain of the polymer.

In the repeating unit of Chemical Formulas 1 to 3, $X_1$ to $X_3$ are the same as or different from each other, and can each independently be a tetravalent organic group. $X_1$ to $X_3$ can be a functional group derived from a tetracarboxylic acid anhydride compound which is used in the synthesis of a polyamic acid, a polyamic acid ester, or a polyimide.

More specifically, $X_1$ to $X_3$ can each independently be one of the tetravalent organic groups of the following Chemical Formula 5:

[Chemical Formula 5]

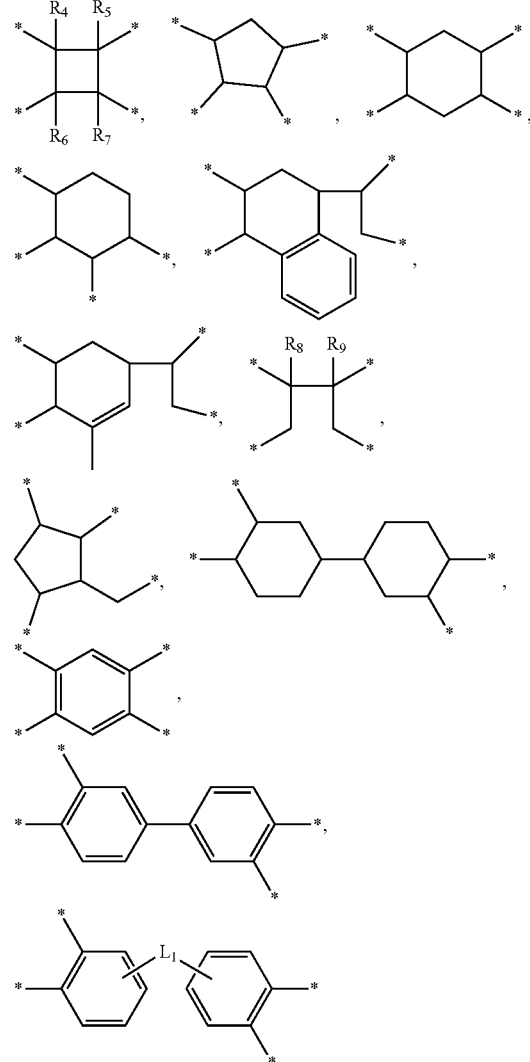

wherein in Chemical Formula 5, $R_4$ to $R_9$ are each independently hydrogen or an alkyl group having 1 to 10 carbon atoms; $L_1$ is any one selected from the group consisting of a direct bond. —O—, —CO—, —S—, —SO—, —$SO_2$—, —$CR_{10}R_{11}$—, —CONH—, —COO—, —$(CH_2)_b$—, —$O(CH_2)_bO$—, —COO—$(CH_2)_b$—OCO—, phenylene, or a combination thereof, wherein $R_{10}$ and $R_{11}$ are each independently hydrogen, an alkyl group having 1 to 10 carbon atoms, or a haloalkyl group having 1 to 10 carbon atoms; and b is an integer from 1 to 10.

Specifically, $X_1$ to $X_3$ can each independently be an organic group of the following Chemical Formula 5-1 derived from pyromellitic dianhydride (PMDA); an organic group of the following Chemical Formula 5-2 derived from 3,3',4,4'-biphenyltetracarboxylic acid dianhydride (BPDA); an organic group of the following Chemical Formula 5-3 derived from 1,2,4,5-cyclohexanetetracarboxylic dianhydride (HPMDA); or an organic group of the following Chemical Formula 5-4 derived from 1,3-dimethyl-cyclobutane-1,2,3,4-tetracarboxylic acid dianhydride (DMCBDA):

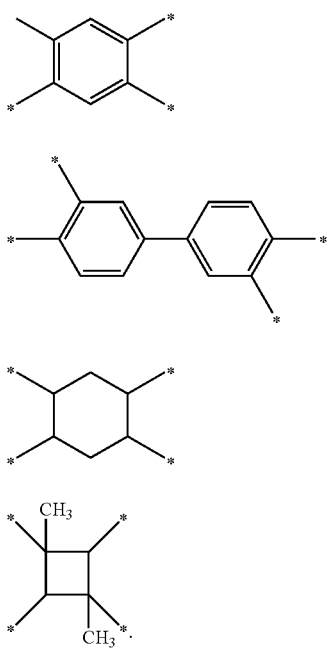

[Chemical Formula 5-1]

[Chemical Formula 5-2]

[Chemical Formula 5-3]

[Chemical Formula 5-4]

More preferably, the organic group of Chemical Formula 5-2 derived from 3,3',4,4'-biphenyltetracarboxylic acid dianhydride can be used.

In Chemical Formulas 1 to 3, $Y_1$ to $Y_3$ are the same as or different from each other, and can each independently be a divalent organic group. $Y_1$ to $Y_3$ can be a functional group derived from a diamine compound used in the synthesis of a polyamic acid, a polyamic acid ester, or a polyimide.

As a specific example, $Y_1$ to $Y_3$ can be a divalent organic group of Chemical Formula 4.

In Chemical Formula 4, A is a Group 15 element, $R_3$ is hydrogen or an alkyl group having 1 to 10 carbon atoms, a is an integer from 1 to 3, at least one (i.e., one or more) of $Z_1$ to $Z_4$ is nitrogen and the rest are carbon.

The Group 15 element can be nitrogen (N), phosphorus (P), arsenic (As), antimony (Sb), or bismuth (Bi). $R_3$ is a functional group which binds to the A and can be bonded to the A element, wherein the number of $R_3$ functional group(s) is a. Preferably, in Chemical Formula 4, A can be nitrogen, $R_3$ can be hydrogen, and a can be 1.

On the other hand, in Chemical Formula 4, by satisfying the condition that at least one of $Z_1$ to $Z_4$ is nitrogen and the rest are carbon, Chemical Formula 4 can form an asymmetric structure that is not symmetrical with reference to the central point or center line due to the nitrogen atom. Chemical Formula 4 is a functional group derived from a diamine, which is a precursor used for the formation of a polymer for a liquid crystal alignment agent, and appears to result from the use of an asymmetric diamine as described below.

In view of the fact that the structure of asymmetric diamines or repeating units derived therefrom, and the effect resulting therefrom, have never been acknowledged in the field of polymers for liquid crystal alignment agents known in the art, the functional group of Chemical Formula 4 and a diamine compound which is a precursor thereof appear to be novel.

More preferably, in Chemical Formula 4, one of $Z_1$ to $Z_4$ can be nitrogen and the rest can be carbon, and in Chemical Formula 4, one of $Z_1$ and $Z_3$ can be nitrogen, the other can be carbon, and $Z_2$ and $Z_4$ can be carbon. That is, the aromatic ring containing $Z_1$ to $Z_4$ in Chemical Formula 4 can have a pyridine structure. Thus, the liquid crystal display to which the polymer for a liquid crystal alignment agent of one embodiment is applied can realize a high voltage holding ratio and liquid crystal alignment property.

On the other hand, when two aromatic ring compounds are bonded by a single bond without a secondary amine group or a tertiary amine group, there can be technical problems that the luminance fluctuation rate of the liquid crystal alignment agent is increased, the afterimage characteristic is defective, and the voltage holding ratio is remarkably reduced.

In addition, when each of the two aromatic ring compounds bonded via a secondary amine group or a tertiary amine group does not contain a nitrogen atom, the imidization reaction cannot proceed sufficiently (for example, through heat treatment at 230° C.) even if the imidization reaction proceeds on the polyamic acid or the polyamic acid ester formed by the reaction of the amine and the acid anhydride. Thus, there is a limit in that the imidization rate in the final liquid crystal alignment film decreases.

Further, the functional group of Chemical Formula 4 is characterized in that only the amine group and hydrogen are bonded to each of the two aromatic ring compounds, preferably the heteroaromatic ring compound and the aromatic ring compound, and no other substituent is introduced. When a substituent, for example, a fluoroalkyl group, is introduced into a heteroaromatic ring compound or an aromatic ring compound, there can be technical problems that the luminance fluctuation rate is increased, the afterimage characteristic is defective, and the voltage holding ratio is remarkably reduced.

In addition, Chemical Formula 4 can be at least one functional group selected from the group consisting of the following Chemical Formulas 4-1, 4-2, and 4-3:

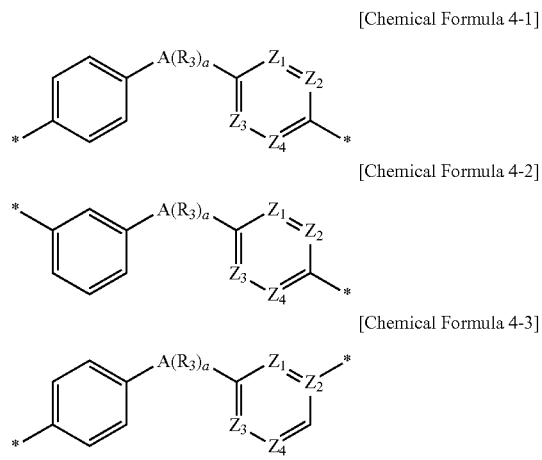

[Chemical Formula 4-1]

[Chemical Formula 4-2]

[Chemical Formula 4-3]

wherein the definitions of A, $R_3$, a, $Z_1$, $Z_2$, $Z_3$, and $Z_4$ described in Chemical Formulas 4-1, 4-2, and 4-3 include those described above in Chemical Formula 4.

As described above, as the functional group of Chemical Formula 4 can be at least one functional group selected from the group consisting of Chemical Formulas 4-1, 4-2, and 4-3, excellent liquid crystal alignment properties can be realized.

More preferably, in Chemical Formulas 4-1 to 4-3, A can be nitrogen, $R_3$ can be hydrogen, a can be 1, one of $Z_1$ and $Z_3$ can be nitrogen, the other can be carbon, and $Z_2$ and L can be carbon. Specifically, Chemical Formula 4 can be at least one functional group selected from the group consisting of the following Chemical Formulas 4-4, 4-5, and 4-6:

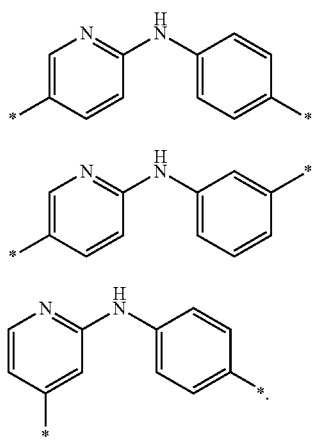

[Chemical Formula 4-4]

[Chemical Formula 4-5]

[Chemical Formula 4-6]

That is, Chemical Formula 4-1 in which A is nitrogen, $R_3$ is hydrogen, a is 1, one of $Z_1$ and $Z_3$ is nitrogen, the other is carbon, and $Z_2$ and $Z_4$ are carbon is a functional group of Chemical Formula 4-4. Further, Chemical Formula, 4 2 in which A is nitrogen, $R_3$ is hydrogen, a is 1, one of $Z_1$ and $Z_3$ is nitrogen, the other is carbon, and $Z_2$ and $Z_4$ are carbon is a functional group of Chemical Formula 4-5, Further, Chemical Formula 4-3 in which A is nitrogen, $R_3$ is hydrogen, a is 1, one of $Z_1$ and $Z_3$ is nitrogen, the other is carbon, and $Z_2$ and $Z_4$ are carbon is a functional group of Chemical Formula 4-6.

On the other hand, the polymer can be one in which an acid anhydride group is bonded to at least one terminus thereof. That is, the polymer can include, as a main chain, the repeating units of Chemical Formulas 1 to 3 described above, and can exist in a state in which an acid anhydride group is bonded to either one or both termini of the main chain.

Examples of the method of bonding the acid anhydride group to at least one terminus of the polymer are not particularly limited, and for example, among the diamine compound and the tetracarboxylic acid anhydride compound, which are reaction monomers used for the production of the polymer, a method in which the molar content of a tetracarboxylic acid anhydride compound is excessively added in comparison with the molar content of the diamine compound can be used.

On the other hand, the above-mentioned polymer includes a polymer containing at least one repeating unit selected from the group consisting of the repeating unit of Chemical Formula 1, the repeating unit of Chemical Formula 2, and the repeating unit of Chemical Formula 3 in which an acid anhydride group is bonded to at least one terminus thereof (hereinafter referred to as a first polymer), and can further include, in addition to the first polymer, a second polymer containing at least one repeating unit selected from the group consisting of the repeating unit of Chemical Formula 1, the repeating unit of Chemical Formula 2 and the repeating unit of Chemical Formula 3 and having at least one terminal functional group selected from the group consisting of the following Chemical Formulas 7, 8, and 9 at one or more termini thereof:

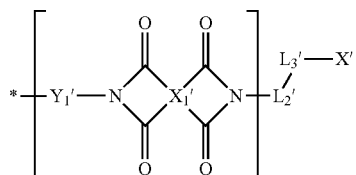

[Chemical Formula 7]

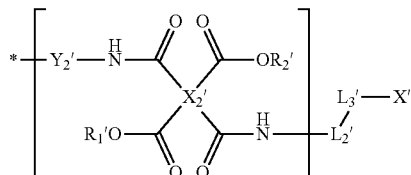

[Chemical Formula 8]

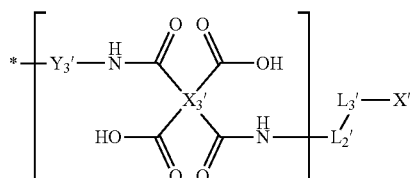

[Chemical Formula 9]

wherein in Chemical Formulas 7 to 9, one of $R_1'$ and $R_2'$ is an alkyl group having 1 to 10 carbon atoms and the other is hydrogen or an alkyl group having 1 to 10 carbon atoms; $X_1'$ to $X_3'$ are each independently a tetravalent organic group; $Y_1'$ to $Y_3'$ are each independently a divalent organic group of the following Chemical Formula 4; $L_2'$ and $L_3'$ are each independently any one selected from among a direct bond, —O—, —CO—, —S—, —CONH—, —COO—, —O(CH$_2$)$_t$O—, —COO—(CH$_2$)$_t$—OCO—, an alkylene group having 1 to 10 carbon atoms, a haloalkylene group having 1 to 10 carbon atoms, a cycloalkylene group having 3 to 20 carbon atoms, a heterocycloalkylene group having 3 to 20 carbon atoms, an arylene group having 6 to 30 carbon atoms, and a heteroarylene group having 3 to 20 carbon atoms; t is an integer from 1 to 10; and X' is one of hydrogen, a hydroxy group, a nitro group, and an alkyl group having 1 to 10 carbon atoms:

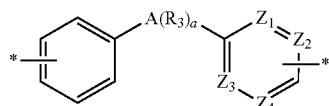

[Chemical Formula 4]

wherein in Chemical Formula 4, A is a Group 15 element, $R_3$ is one of hydrogen and an alkyl group having 1 to 10 carbon atoms, a is an integer from 1 to 3, at least one of $Z_1$ to $Z_4$ is nitrogen and the rest are carbon.

Specifically, the second polymer corresponds to a reaction product in which a polymer containing at least one selected from the group consisting of a repeating unit of Chemical Formula 1, a repeating unit of Chemical Formula 2, and a repeating unit of Chemical Formula 3 which are contained in the liquid crystal alignment agent composition of one embodiment, in which an acid anhydride group is bonded to at least one terminus thereof, reacts with the terminal modifier compound containing an amino group to thereby modify the terminal acid anhydride group.

That is, the acid anhydride group bonded to at least one terminus of the polymer can react with an amino group of the terminal modifier compound to modify the acid anhydride group into an imide group, an amic acid group, or an amic acid ester group.

In Chemical Formulas 7 to 9, $X_1'$ to $X_3'$ are the same as or different from each other, and can each independently be a tetravalent organic group. $X_1'$ to $X_3'$ can be a functional group derived from a tetracarboxylic anhydride compound used in the synthesis of a polyamic acid, a polyamic acid ester, or a polyimide.

More specifically, $X_1'$ to $X_3'$ can each independently be one of the tetravalent organic groups of Chemical Formula 5.

Moreover, in Chemical Formulas 7 to 9, $Y_1'$ to $Y_3'$ can be the same as or different from each other, and can each independently be a divalent organic group. [$Y_1'$ to $Y_3'$ can be a functional group derived from a diamine compound used in the synthesis of a polyamic acid, a polyamic acid ester, or a polyimide. As a specific example, $Y_1'$ to $Y_3'$ can be a divalent organic group of Chemical Formula 4.

Further, in Chemical Formulas 7 to 9, one of $R_1'$ and $R_2'$ can be an alkyl group having 1 to 10 carbon atoms and the other can be hydrogen or an alkyl group having 1 to 10 carbon atoms.

The second polymer can be contained in an amount from 0.5% to 40% by weight, 1% to 30% by weight, 1% to 20% by weight, or 1% to 10% by weight based on the entire liquid crystal alignment agent composition. That is, in the liquid crystal alignment agent composition, a first polymer in which an acid anhydride group is bonded to at least one terminus, a terminal modifier, and a second polymer in which an acid anhydride group is modified by a terminal modifier can be mixed.

When the second polymer is excessively reduced to less than 0.5% by weight based on the entire liquid crystal alignment agent composition, the degree of modification of the polymer terminus is insignificant, and thus it is difficult to sufficiently realize improvement in light transmittance and electrical characteristics of the liquid crystal alignment agent composition. Also, if the second polymer is excessively increased to more than 40% by weight based on the entire liquid crystal aligning composition, there is a limit in that the alignment properties and electrical characteristics inherent to the polymer are deteriorated.

(2) Terminal Modifier Compound Containing an Amino Group

The liquid crystal alignment agent composition of one embodiment can include, in addition to the above-mentioned polymer, a terminal modifier compound containing an amino group, and the above-mentioned anhydride group at the terminus of the polymer can be effectively modified by the amino group contained in the terminal modifier compound. Therefore, when using a terminal modifier containing a functional group that is difficult to chemically react with an acid anhydride group at the terminus of the polymer, it is difficult to obtain a sufficient effect to realize the present invention.

As the terminal modifier compound containing an amino group, various organic compounds or inorganic compounds containing an amino group in the molecule can be used, and the type of the organic compound or the inorganic compound is not particularly limited.

Preferably, as the terminal modifier compound, a monoamine compound containing one amino group can be used. When a multifunctional amine containing two or more amino groups is used as the terminal modifier compound, a side reaction with a monomer (e.g., tetracarboxylic acid anhydride) of the polymer or the like proceeds, after the modification reaction with an acid anhydride group at the polymer terminus, and thereby, the viscosity of the liquid crystal alignment agent composition can increase, and problems resulting from printing errors can occur.

Specific examples of the terminal modifier compound containing an amino group can be a compound of the following Chemical Formula 6:

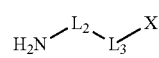

[Chemical Formula 6]

wherein in Chemical Formula 6, $L_2$ and $L_3$ are each independently any one selected from among a direct bond, —O—, —CO—, —S—, —CONH—, —COO—, —O(CH$_2$)$_t$O—, —COO—(CH$_2$)$_t$—OCO—, an alkylene group having 1 to 10 carbon atoms, a haloalkylene group having 1 to 10 carbon atoms, a cycloalkylene group having 3 to 20 carbon atoms, a heterocycloalkylene group having 3 to 20 carbon atoms, an arylene group having 6 to 30 carbon atoms, and a heteroarylene group having 3 to 20 carbon atoms, t is an integer from 1 to 10, and X is any one of hydrogen, a hydroxy group, a nitro group, and an alkyl group having 1 to 10 carbon atoms.

More preferably, the terminal modifier compound of Chemical Formula 6 can be 3-aminophenol in which $L_2$ is a direct bond, $L_3$ is a phenylene group having 6 carbon atoms, and X is a hydroxy group. Further, the terminal modifier compound of Chemical Formula 6 can be an aniline in which $L_2$ is a direct bond, $L_3$ is a phenylene group having 6 carbon atoms, and X is hydrogen.

The terminal modifier compound containing an amino group can be used in an amount from 0.1% to 20% by weight, 1% to 20% by weight, 1% to 10% by weight, or 1% to 5% by weight, based on the total weight of the liquid crystal alignment agent composition. When the content of the terminal modifier compound is excessively large, there is a limit in that the number of repeating units of the molecule is decreased and the alignment properties and electrical characteristics inherent to the polymer are deteriorated.

On the other hand, when the content of the terminal modifier compound is too small, it can be difficult to sufficiently realize the effect of improving the light transmittance and electrical characteristics due to the modification of the terminal acid anhydride group of the polymer for a liquid crystal aligning agent.

II. Method of Preparing Liquid Crystal Alignment Film

Another embodiment of the invention provides a method for preparing a liquid crystal alignment film, including: a step of coating the liquid crystal alignment agent composition of the one embodiment onto a substrate to form a coating film (step 1); a step of drying the coating film (step 2); a step of irradiating the dried coating film with light or rubbing the coating film to perform alignment treatment (step 3); and a step of heat-treating and curing the alignment-treated coating film (step 4).

Step 1 is a step of coating the above-mentioned liquid crystal alignment agent composition onto a substrate to form a coating film. The details of the liquid crystal alignment agent composition include those described above in one embodiment.

The method of coating the liquid crystal alignment agent composition onto a substrate is not particularly limited, and for example, a method such as screen printing, offset printing, flexographic printing, inkjet printing, and the like can be used.

Further, the liquid crystal alignment agent composition can be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more.

In addition, the liquid crystal alignment agent composition can further include other components in addition to the organic solvent. In a non-limiting example, when the liquid crystal alignment agent composition is coated, additives capable of improving the uniformity of the thickness of a film and the surface smoothness, improving the adhesion between a liquid crystal alignment film and a substrate, or changing the dielectric constant and conductivity of a liquid crystal alignment film, or increasing the denseness of a liquid crystal alignment film, can be further included. Examples of these additives include various kinds of solvents, surfactants, silane-based compounds, dielectrics, crosslinking compounds, etc.

Step 2 is a step of drying the coating film formed by coating the liquid crystal alignment agent composition onto a substrate.

The step of drying the coating film can be performed by a heating means such as a hot plate, a hot air circulating oven, an infrared oven, and the like, and the drying can be performed at a temperature of 50° C. to 150° C., or 50° C. to 100° C.

Step 3 is a step of irradiating the dried coating film with light or rubbing the coating film to perform alignment treatment.

In the alignment treatment step, the light irradiation can be performed by irradiating polarized ultraviolet rays having a wavelength of 150 nm to 450 nm. In this case, the intensity of the light exposure can vary depending on the kind of the polymer for a liquid crystal aligning agent, and energy of 10 mJ/cm$^2$ to 10 J/cm$^2$, preferably energy of 30 mJ/cm$^2$ to 2 J/cm$^2$, can be irradiated.

As for the ultraviolet rays, polarized ultraviolet rays selected among ultraviolet rays subjected to polarization treatment by a method of passing through or reflecting by a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays can be irradiated perpendicularly to the surface of the substrate, or can be irradiated by directing an angle of incidence at a specific angle. By this method, the alignment capability of the liquid crystal molecules is imparted to the coating film.

Further, in the alignment treatment step, a method using a rubbing cloth can be employed. More specifically, in the rubbing treatment, the surface of the coating film after the heat treatment step can be rubbed in one direction while rotating the rubbing roller in which a rubbing cloth is attached to a metal roller.

Step 4 is a step of heat-treating and curing the alignment-treated coating film. In this case, the heat treatment can be performed by a heating means such as a hot plate, a hot-air circulation furnace, an infrared furnace, and the like, and the heat treatment can be performed at a temperature of 180° C. to 300° C., or 200° C. to 300° C.

III. Liquid Crystal Alignment Film

Further, in another embodiment of the invention, a liquid crystal alignment film prepared in accordance with the method for preparing a liquid crystal alignment film described above can be provided. Specifically, the liquid crystal alignment film can include an aligned cured product of the liquid crystal alignment agent composition of the one embodiment. The aligned cured product means a material obtained through an alignment step and a curing step of the liquid crystal alignment agent composition of the one embodiment.

As described above, when a liquid crystal alignment agent composition including: a polymer containing at least one repeating unit selected from the group consisting of a repeating unit of Chemical Formula 1, a repeating unit of Chemical Formula 2, and a repeating unit of Chemical Formula 3, in which an acid anhydride group is bonded to at least one terminus thereof; and a terminal modifier compound containing an amino group is used, it is possible to produce a liquid crystal alignment film having high light transmittance, and excellent alignment properties and electrical characteristics.

The thickness of the liquid crystal alignment film is not particularly limited, but for example, it can be freely adjusted within the range of 0.001 μm to 100 μm. If the thickness of the liquid crystal alignment film increases or decreases by a specific value, the physical properties measured in the alignment film can also change by a certain value.

Specifically, the liquid crystal alignment film can have a variation in transmittance of 0.75% or less, 0.7% or less, 0.1% to 0.75%, 0.2% to 0.75%, or 0.3% to 0.7% as measured according to the following Mathematical Equation 2. The variation in viscosity of the liquid crystal alignment film can be a value measured with respect to a liquid crystal alignment film having a thickness of, for example, 0.01 μm to or 0.05 μm to 50 μm.

Variation in transmittance (%)=Transmittance of second liquid crystal alignment film−Transmittance of first liquid crystal alignment film [Mathematical Equation 2]

Examples of the specific method for measuring the transmittance in the Mathematical Equation 2 are not particularly limited, but for example, a method of measuring the transmittance at a wavelength of 400 nm using a JASCO Asia Portal V-770 UV-VIS-NIR spectrophotometer can be used.

In addition, the liquid crystal alignment film can have a variation in viscosity of 10 cP or less, 5 cP or less, 3 cP or less, 0.1 cP to 10 cP, 0.1 cP to 5 cP, 0.1 cP to 3 cP, or 2.01 cP to 2.41 cP as measured according to the following Mathematical Equation 3. The variation in viscosity of the liquid crystal alignment film can be a value measured with respect to a liquid crystal alignment film having a thickness of, for example, 0.01 μm to 10 μm, or 0.05 μm to 50 μm.

Variation in viscosity (cP)=(Viscosity of liquid crystal alignment film after storage for 30 days at room temperature–Viscosity of initial liquid crystal alignment film)     [Mathematical Equation 3]

Examples of the specific method of measuring the viscosity from Mathematical Equation 3 are not particularly limited, but for example, a method of measuring the amount of torque using a Brookfield viscometer with an RV-7 spindle at a temperature of 25° C. and a rotational speed of 0.5 rpm can be used.

IV. Liquid Crystal Display

In addition, in a further embodiment of the invention, a liquid crystal display including the liquid crystal alignment film described above can be provided.

The liquid crystal alignment film can be introduced into a liquid crystal cell by a known method, and likewise, the liquid crystal cell can be introduced into a liquid crystal display by a known method. The liquid crystal alignment film can be prepared from the liquid crystal alignment agent composition of one embodiment, thereby achieving excellent stability together with excellent various physical properties. Consequently, the liquid crystal display capable of exhibiting high reliability can be provided.

On the other hand, the liquid crystal display can have an initial voltage holding ratio (VHR) of 90% or more, or 90% to 100%, as measured under the conditions of 1 Hz and 60° C. using 6254C equipment available from TOYO Corporation.

Further, the liquid crystal display can have a rate of change in voltage holding ratio of 7% or less, 5% or less, 3% or less, 0.1% to 7%, 0.1% to 5%, 0.1% to 3%, 1% to 3%, or 1.5% to 2.3% as measured by the following Mathematical Equation 1:

VHR change rate (%)=Initial VHR ($V_0$)–VHR after storage ($V_1$)     [Mathematical Equation 1]

wherein in Mathematical Equation 1, the initial voltage holding ratio ($V_0$) is a voltage holding ratio measured with respect to the liquid crystal alignment cell under the conditions of 1 Hz and 60° C. using 6254C equipment (TOYO Corporation) as a measuring device. After storing the liquid crystal alignment cell for 120 hours under the same conditions, the VHR after storage ($V_1$) is a voltage holding ratio measured at 1 Hz and 60° C. using the same equipment.

Further, the luminance fluctuation rate of the liquid crystal display can be less than 10%. The luminance fluctuation rate can be determined as follows. Polarizing plates are attached to the upper and lower plates of the liquid crystal display. The polarizing plate-attached liquid crystal display is attached onto a backlight of 7000 cd/m². A difference between an initial luminance (L0) in which the luminance at a black state is measured using a luminance measuring instrument PR-880 and a later luminance (L1) measured after operation at room temperature and an alternating voltage of 5 V for 24 hours is divided by the initial luminance (L0), and then multiplied by 100 to calculate a luminance fluctuation rate. When the luminance fluctuation rate of the liquid crystal display is increased by 10% or more, it can be estimated that the afterimage characteristic of the liquid crystal display is defective.

Advantageous Effects

According to the present invention, a liquid crystal alignment agent composition capable of having a low discoloration property even during long-term storage and thus exhibiting excellent light transmittance when applied as a liquid crystal alignment film, and also of realizing improved alignment properties and electrical characteristics, a method for preparing a liquid crystal alignment film using the same, and a liquid crystal alignment film and a liquid crystal display using the same, can be provided.

EXAMPLES

The present invention will be described in more detail with reference to the following examples. However, these examples are given for illustrative purposes only, and the scope of the invention is not intended to be limited to or by these examples.

Preparation Example: Preparation of Diamine

Preparation Example 1

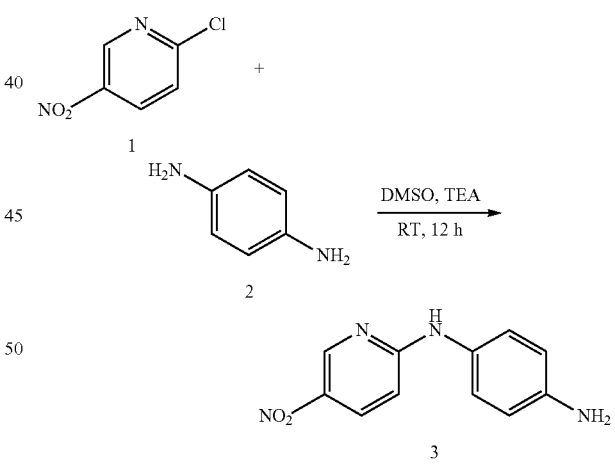

18.3 g (100 mmol) of 2-chloro-5-nitropyridine (compound 1) and 12.5 g (98.6 mmol) of paraphenylenediamine (p-PDA, compound 2) were completely dissolved in 200 mL of dimethylsulfoxide (DMSO), and then 23.4 g (200 mmol) of triethylamine (TEA) was added, and the mixture was stirred at room temperature for 12 hours. When the reaction was completed, the reaction mixture was poured into a container containing 500 mL of water and stirred for 1 hour. The solid obtained by filtration was washed with 200 mL of water and 200 mL of ethanol to obtain 16 g (61.3 mmol) of Compound 3 (Yield: 60%).

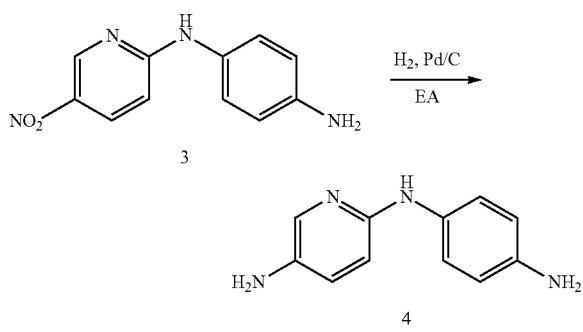

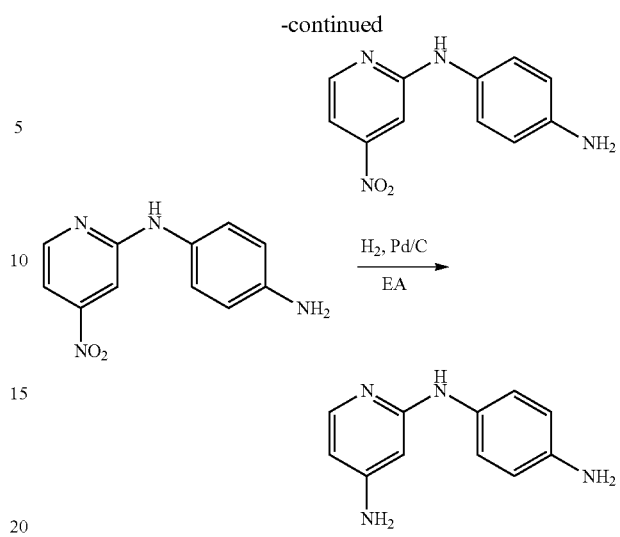

Compound 3 was dissolved in 200 mL of a 1:1 mixture of ethyl acetate (EA) and THF, and 0.8 g of palladium (Pd)/carbon (C) was added and stirred for 12 hours under a hydrogen atmosphere. After completion of the reaction, the mixture was filtered through a Celite pad and the filtrate was concentrated to obtain 11 g of Compound 4 diamine (N-4-aminophenyl-2,5-pyridinediamine, p-IDA) (Yield: 89%).

Preparation Example 2

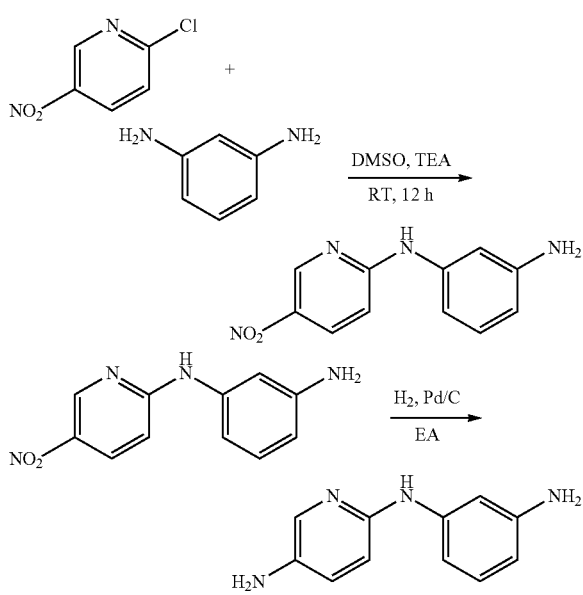

The diamine of Preparation Example 2 was prepared in the same manner as in Preparation Example 1, except that m-phenylenediamine (m-PDA) was used instead of p-phenylenediamine (p-PDA, Compound 2).

Preparation Example 3

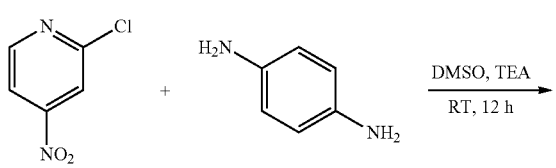

The diamine of Preparation Example 3 was prepared in the same manner as in Preparation Example 1, except that 2-chloro-4-nitropyridine was used instead of 2-chloro-5-nitropyridine (Compound 1).

Example: Preparation of Liquid Crystal Alignment Agent Composition and Liquid Crystal Alignment Film Example 1

(1) Preparation of Liquid Crystal Alignment Agent Composition 7.60 g (38 mmol) of the diamine (N-4-aminophenyl-2,5-pyridinediamine) prepared in Preparation Example 1 was completely dissolved in NMP Then, 11.77 g (40 mmol) of 3,3',4,4'-biphenyltetracarboxylic acid dianhydride was added to the solution and stirred at 25° C. for 4 hours to synthesize a polymer for a liquid crystal alignment agent in which an acid anhydride group was bonded to its terminus. Then, 0.44 g (4 mmol) of 3-aminophenol was added as a terminal modifier and stirred for 20 hours to prepare a liquid crystal alignment agent composition.

(2) Preparation of Liquid Crystal Alignment Film

The liquid crystal alignment agent composition obtained in (1) of Example 1 was spin-coated onto a rectangular glass substrate having a size of 2.5 cm×2.7 cm, in which an ITO electrode having a thickness of 60 nm and an area of 1 cm×1 cm was patterned. Then, the substrate coated with the liquid crystal alignment agent composition was placed on a hot plate and dried at 80° C. for 2 minutes. Subsequently, the dried coating film was irradiated with ultraviolet rays (254 nm) at a dose of 0.25 J/cm$^2$ using an exposure apparatus to which a linear polarizer was attached, to perform alignment treatment. Then, the alignment-treated film was calcinated (cured) in an oven at 230° C. for 15 minutes to prepare a liquid crystal alignment film having a thickness of 0.1 μm.

Example 2

A liquid crystal alignment agent composition and a liquid crystal alignment film were prepared in the same manner as in Example 1, except that aniline was added instead of 3-aminophenol as the terminal modifier.

Comparative Example: Preparation of Liquid Crystal Alignment Agent Composition and Liquid Crystal Alignment Film Comparative Example 1

A liquid crystal alignment agent composition and a liquid crystal alignment film were prepared in the same manner as in Example 1, except that 3-aminophenol as the terminal modifier was not added.

Comparative Example 2

A liquid crystal alignment agent composition and a liquid crystal alignment film were prepared in the same manner as in Example 1, except that 5-(2,5-dioxotetrahydro-3-furanyl)-6-methylhexahydro-2-benzofuran-1,3-dione of the following Chemical Formula A was used instead of 3-aminophenol as the terminal modifier:

[Chemical Formula A]

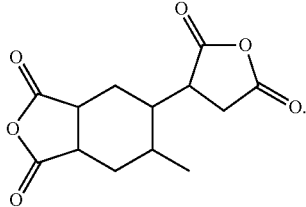

Comparative Example 3

A liquid crystal alignment agent composition and a liquid crystal alignment film were prepared in the same manner as in Example 1, except that p-phenylenediamine (p-PDA) was added instead of N-4-aminophenyl-2,5-pyridinediamine.

Experimental Example: Measurement of Physical Properties of Liquid Crystal Alignment Agent Composition and Liquid Crystal Alignment Film Obtained in Examples and Comparative Examples The physical properties of the liquid crystal alignment agent composition or the liquid crystal alignment film obtained in the examples and comparative examples, and the liquid crystal alignment cell prepared using the same were measured by the following methods, and the results are shown in Table 1 below.

A specific method for producing a liquid crystal alignment cell was as follows. The liquid crystal alignment films formed on the two glass substrates each used as the upper plate/lower plate were aligned such that they faced each other and the alignment directions were aligned with each other, and then the upper and lower plates were bonded together and cured with a sealing agent to prepare an empty space. Then, a liquid crystal was injected into the empty cells, and the injection hole was sealed with a sealing agent to prepare a liquid crystal alignment cell.

1. AC Afterimage

Polarizing plates were attached to the upper and lower plates of the liquid crystal alignment cell so as to be perpendicular to each other. The polarizing plate-attached liquid crystal alignment cell was attached onto a backlight of 7000 cd/m$^2$, and the luminance at a black state was measured using a luminance or brightness measuring instrument PR-880. Then, the liquid crystal cell was operated at room temperature with an alternating voltage of 5 V for 24 hours. Thereafter, at the voltage-off state of the liquid crystal cell, luminance at the black state was measured in the same manner as described above. A difference between the initial luminance (L0) measured before operation of the liquid crystal cell and the later luminance (L1) measured after operation was divided by the initial luminance (L0), and then multiplied by 100 to calculate a luminance fluctuation rate. When the calculated luminance fluctuation rate is close to 0%, it means that the alignment stability is excellent. Through the measurement results of the luminance fluctuation rate, the afterimage level was evaluated under the following criteria.

Excellent: when the luminance fluctuation rate is less than 10%

Ordinary: when the luminance fluctuation rate is between 10% and 20%.

Defective: when the luminance fluctuation rate is greater than 20%.

2. Voltage Holding Ratio (VHR)-Long-Term Reliability

The initial voltage holding ratio ($V_0$) of the liquid crystal alignment cell was measured under the conditions of 1 Hz and 60° C. using 6254C equipment (TOYO Corporation) as a measuring device. After storing the liquid crystal alignment cell for 120 hours with the same equipment under the same conditions, the voltage holding ratio ($V_1$) was measured at 1 Hz and 60° C., and the rate of change in voltage holding ratio was calculated according to the following Mathematical Equation 1 to evaluate the long-term reliability:

VHR change rate (%)=initial VHR ($V_0$)–VHR after storage ($V_1$)   [Mathematical Equation 1]

3. Long-Term Discoloration

After the liquid crystal alignment agent compositions of the examples and comparative examples were stored for 120 hours at room temperature (25° C.) and humidity of 40% or less, a first liquid crystal alignment film was produced by the method described in (2) of Example 1 above.

In addition, liquid crystal alignment agent compositions of the examples and comparative examples were not stored for 120 hours at room temperature (25° C.) and humidity of 40% or less, and a second liquid crystal alignment film was immediately prepared by the method described in (2) of Example 1.

Subsequently, the transmittance of each of the first liquid crystal alignment film and the second liquid crystal alignment film was measured at a wavelength of 400 nm using a JASCO Asia Portal V-770 UV-VIS-NIR spectrophotometer, and the variation in transmittance was calculated through the following Mathematical Equation 2 to evaluate the long-term discoloration:

Variation in transmittance (%)=Transmittance of second liquid crystal alignment film–Transmittance of first liquid crystal alignment film   [Mathematical Equation 2]

4) Storage Stability

With respect to the liquid crystal alignment agent compositions of the examples and comparative examples, the initial viscosity and the viscosity after storage at room temperature (20 to 30° C.) for 30 days were respectively measured, and the variation in viscosity was measured according to the following Mathematical Equation 3.

The viscosity of the liquid crystal alignment film can be determined by measuring the amount of torque using a Brookfield viscometer with an RV-7 spindle at a temperature of 25° C. and a rotational speed of 0.5 rpm.

Variation in viscosity (cP)=(Viscosity of liquid crystal alignment film after storage for 30 days at room temperature−Viscosity of initial liquid crystal alignment film) [Mathematical Equation 3]

TABLE 1

Results of Measurement of Experimental Examples of Examples and Comparative Examples

| Category | Example 1 | Example 2 | Comparative Example 1 | Comparative Example 2 | Comparative Example 3 |
|---|---|---|---|---|---|
| Diamine | p-IDA | p-IDA | p-IDA | p-IDA | p-PDA |
| Type of terminal modifier | 3-aminophenol | Aniline | — | Formula A | 3-aminophenol |
| AC afterimage | Excellent | Excellent | Excellent | Ordinary | Defective |
| Initial VHR | 99% | 99% | 99% | 99% | 78% |
| VHR long-term reliability | Excellent 1.5% | Excellent 2.3% | Defective 7.2% | Defective 13.4% | Defective 15.8% |
| Long-term discoloration | 0.3% | 0.7% | 3.4% | 1.0% | 0.8% |
| Variation in viscosity | 2.01 cP | 2.41 cP | 1.24 cP | 72 cP | 2.21 cP |

* p-IDA: N-4-Aminophenyl-2,5-pyridinediamine
* p-PDA: p-phenylenediamine
* Chemical Formula A

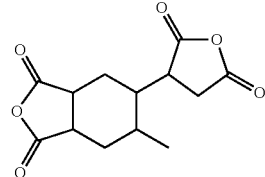 [SMILES: CC1CC2C(=O)OC(=O)C2CC1C1CC(=O)OC1=O]

As shown in Table 1, in the case of the liquid crystal alignment agent compositions of the examples in which an amine compound such as 3-aminophenol or aniline as a terminal modifier was used together with a polyimide synthesized from p-IDA or a precursor polymer thereof within a liquid crystal alignment agent composition, the luminance fluctuation rate of the alignment cell obtained therefrom was less than 10%, indicating excellent alignment stability; even during long-term storage, the rate of change of VHR was low from 1.5% to 2.3%, showing excellent electrical reliability; and even during long-term storage, the variation in transmittance of the alignment film was low from 0.3% to 0.7% and the variation in viscosity was also low from 2.01 cP to 2.41 cP, confirming that the reliability of the alignment film was excellent.

On the other hand, in the case of the liquid crystal alignment agent composition of Comparative Example 1 in which no terminal modifier was contained, the rate of change of VHR during long-term storage was 7.2% which was very high as compared with the examples, thus showing that the electrical reliability due to long-term storage was defective, and the variation in transmittance of the alignment film during long-term storage also increased by 3.4%, confirming that the reliability of the alignment film also decreased.

In particular, in the liquid crystal alignment agent composition of Comparative Example 2 to which the additive of the dianhydride structure as shown in Chemical Formula A was applied, the rate of change of VHR during long-term storage was 13.4%, which appeared to be much higher than that of Examples 1 as well as Comparative Example 1, thus showing that the electrical reliability due to the long-term storage was very defective, and the variation in transmittance of the alignment film during long-term storage was also 10%, which was increased as compared with the examples, and the variation in viscosity was also rapidly increased by 72 cP, confirming that the reliability of the alignment film decreased.

On the other hand, in the case of Comparative Example 3 in which the diamine used in the synthesis of the polyimide or its precursor polymer was changed to p-phenylenediamine that is widely used in the field of the liquid crystal alignment agent, not only did it exhibit an initial voltage holding ratio (VHR) of 78%, which was reduced compared to Example 1 showing an initial voltage holding ratio (VHR) of 99%, but also the rate of change of VHR during long-term storage increased rapidly by 15.8%, confirming that the electrical characteristics were defective. In addition, it was confirmed that the luminance fluctuation rate increased by more than 20% and the AC afterimage characteristic was defective.

The invention claimed is:

1. A liquid crystal alignment agent composition comprising:
   a terminal modifier compound containing an amino group; and
   a polymer containing at least one repeating unit selected from the group consisting of a repeating unit of the following Chemical Formula 1, a repeating unit of the following Chemical Formula 2, and a repeating unit of the following Chemical Formula 3, in which an acid anhydride group is bonded to at least one terminus thereof:

Chemical Formula 1

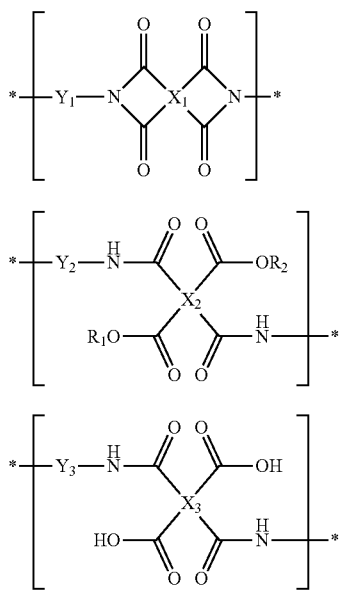

Chemical Formula 2

Chemical Formula 3 wherein in the Chemical Formulas 1 to 3:
one of $R_1$ and $R_2$ is an alkyl group having 1 to 10 carbon atoms and the other is hydrogen or an alkyl group having 1 to 10 carbon atoms;
$X_1$ to $X_3$ are each independently a tetravalent organic group;
$Y_1$ to $Y_3$ are each independently a divalent organic group of the following Chemical Formula 4:

Chemical Formula 4

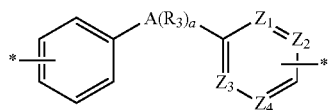

wherein in the Chemical Formula 4:
A is a Group 15 element;
$R_3$ is one of hydrogen and an alkyl group having 1 to 10 carbon atoms;
a is an integer from 1 to 3; and
one of $Z_1$ and $Z_3$ is nitrogen and the other is carbon, and $Z_2$ and $Z_4$ are carbon.

2. The liquid crystal alignment agent composition according to claim 1, wherein in the Chemical Formula 4, A is nitrogen, $R_3$ is hydrogen, and a is 1.

3. The liquid crystal alignment agent composition according to claim 1, wherein the divalent organic group of the Chemical Formula 4 is selected from the group consisting of divalent organic groups of the following Chemical Formulas 4-1, 4-2, and 4-3:

Chemical Formula 4-1

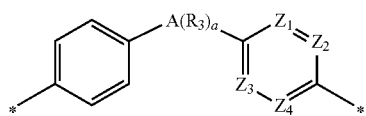

Chemical Formula 4-2

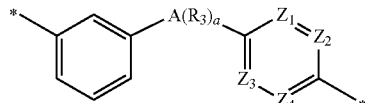

Chemical Formula 4-3

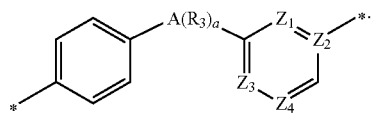

4. The liquid crystal alignment agent composition according to claim 1, wherein $X_1$ to $X_3$ are each independently a tetravalent organic group having one of the following formulas:

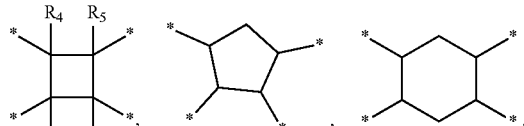

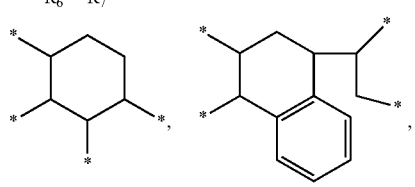

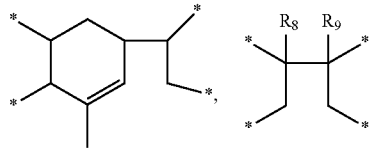

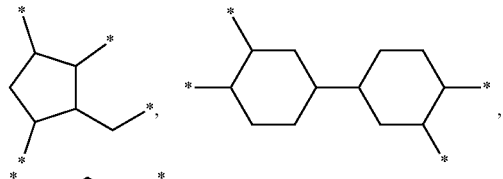

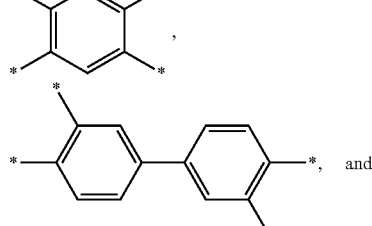

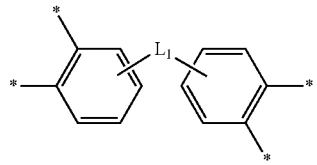

wherein:
$R_4$ to $R_9$ are each independently hydrogen or an alkyl group having 1 to 10 carbon atoms;

$L_1$ is any one selected from the group consisting of a direct bond, —O—, —CO—, —S—, —SO—, —SO$_2$—, —CR$_{10}$R$_{11}$—, —CONH—, —COO—, —(CH$_2$)$_b$—, —O(CH$_2$)$_b$—O—, —COO—(CH$_2$)$_b$—OCO—, phenylene, and a combination thereof;

$R_{10}$ and $R_{11}$ are each independently hydrogen, an alkyl group having 1 to 10 carbon atoms, or a haloalkyl group having 1 to 10 carbon atoms; and b is an integer from 1 to 10.

5. The liquid crystal alignment agent composition according to claim 1, wherein the terminal modifier compound containing an amino group is a compound of the following Chemical Formula 6:

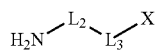

Chemical Formula 6 wherein in the Chemical Formula 6:

$L_2$ and $L_3$ are each independently any one selected from among a direct bond, —O—, —CO—, —S—, —CONH—, —COO—, —O(CH$_2$)$_t$O—, —COO—(CH$_2$)$_t$—OCO—, an alkylene group having 1 to 10 carbon atoms, a haloalkylene group having 1 to 10 carbon atoms, a cycloalkylene group having 3 to 20 carbon atoms, a heterocycloalkylene group having 3 to 20 carbon atoms, an arylene group having 6 to 30 carbon atoms, and a heteroarylene group having 3 to 20 carbon atoms;

t is an integer from 1 to 10; and

X is any one of hydrogen, a hydroxy group, a nitro group, and an alkyl group having 1 to 10 carbon atoms.

6. The liquid crystal alignment agent composition according to claim 1, wherein the content of the terminal modifier compound containing an amino group is 0.1% to 20% by weight based on the total weight of the liquid crystal alignment agent composition.

7. The liquid crystal alignment agent composition according to claim 1, wherein the polymer includes:

a first polymer containing at least one repeating unit selected from the group consisting of the repeating unit of the Chemical Formula 1, the repeating unit of the Chemical Formula 2, and the repeating unit of the Chemical Formula 3 in which an acid anhydride group is bonded to at least one terminus thereof; and a second polymer containing at least one repeating unit selected from the group consisting of the repeating unit of the Chemical Formula 1, the repeating unit of the Chemical Formula 2, and the repeating unit of the Chemical Formula 3 and having at least one terminal functional group selected from the group consisting of the following Chemical Formulas 7, 8, and 9 at one or more termini thereof:

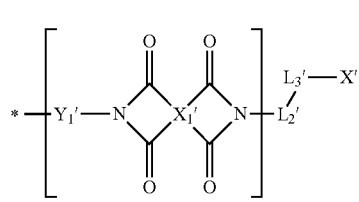

Chemical Formula 7

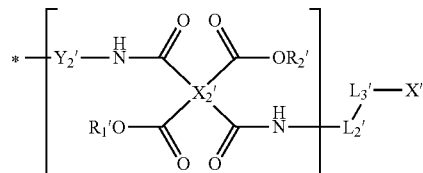

Chemical Formula 8

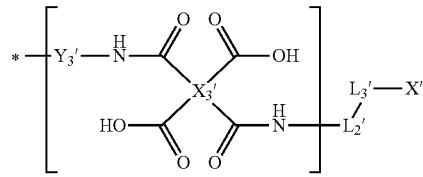

Chemical Formula 9 wherein in the Chemical Formulas 7 to 9:

one of $R_1'$ and $R_2'$ is an alkyl group having 1 to 10 carbon atoms and the other is hydrogen or an alkyl group having 1 to 10 carbon atoms;

$X_1'$ to $X_3'$ are each independently a tetravalent organic group;

$Y_1'$ to $Y_3'$ are each independently a divalent organic group of the following Chemical Formula 4;

$L_2'$ and $L_3'$ are each independently any one selected from among a direct bond, —O—, —CO—, —S—, —CONH—, —COO—, —O(CH$_2$)$_t$O—, —COO—(CH$_2$)$_t$—OCO—, an alkylene group having 1 to 10 carbon atoms, a haloalkylene group having 1 to 10 carbon atoms, a cycloalkylene group having 3 to 20 carbon atoms, a heterocycloalkylene group having 3 to 20 carbon atoms, an arylene group having 6 to 30 carbon atoms, and a heteroarylene group having 3 to 20 carbon atoms;

t is an integer from 1 to 10; and

X' is hydrogen, a hydroxy group, a nitro group, or an alkyl group having 1 to 10 carbon atoms;

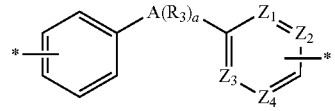

Chemical Formula 4 wherein in the Chemical Formula 4:

A is a Group 15 element;

$R_3$ is one of hydrogen and an alkyl group having 1 to 10 carbon atoms;

a is an integer from 1 to 3; and at least one of $Z_1$ to $Z_4$ is nitrogen and the rest are carbon.

8. The liquid crystal alignment agent composition according to claim 7, wherein the second polymer is contained in an amount from 0.5% to 40% by weight based on the total weight of the liquid crystal alignment agent composition.

9. A method for preparing a liquid crystal alignment film, comprising the steps of:

coating the liquid crystal alignment agent composition of claim 1 onto a substrate to form a coating film;

drying the coating film;

irradiating the dried coating film with light or rubbing the dried coating film to perform alignment treatment; and heat-treating and curing the alignment-treated coating film.

10. The method for preparing a liquid crystal alignment film according to claim 9, wherein the step of drying the coating film is performed at a temperature of 50° C. to 150° C.

11. The method for preparing a liquid crystal alignment film according to claim 9, wherein the step of heat-treating and curing the alignment-treated coating film is performed at a temperature of 180° C. to 300° C.

12. A liquid crystal alignment film, prepared by the method of claim claim 9.

13. A liquid crystal alignment film, comprising an aligned cured product of the liquid crystal alignment agent composition of claim 1.

14. A liquid crystal display, comprising the liquid crystal alignment film of claim 13.

* * * * *